United States Patent [19]

Apsell et al.

[11] Patent Number: 4,908,629
[45] Date of Patent: Mar. 13, 1990

[54] APPARATUS FOR LOCATING AND/OR TRACKING STOLEN OR MISSING VEHICLES AND THE LIKE

[75] Inventors: Sheldon P. Apsell, Newton; Norval D. Stapelfeld, Brookline, both of Mass.

[73] Assignee: Lo-Jack Corporation, Boston, Mass.

[21] Appl. No.: 279,775

[22] Filed: Dec. 5, 1988

Related U.S. Application Data

[62] Division of Ser. No. 847,152, Mar. 31, 1986, Pat. No. 4,818,998.

[51] Int. Cl.[4] .................................................. G01S 5/02
[52] U.S. Cl. ..................................... 342/457; 342/417
[58] Field of Search ................. 342/457, 458, 417, 419

[56] References Cited

U.S. PATENT DOCUMENTS

| | | | |
|---|---|---|---|
| 4,001,828 | 1/1977 | Culpepper | 342/457 |
| 4,494,119 | 1/1985 | Wimbush | 342/457 |
| 4,596,988 | 6/1986 | Wanka | 342/457 |
| 4,742,357 | 5/1988 | Rackley | 342/457 |
| 4,799,062 | 1/1989 | Sanderford, Jr. | 342/457 |

Primary Examiner—Thomas H. Tarcza
Assistant Examiner—Mark Hellner
Attorney, Agent, or Firm—Rines and Rines, Shapiro and Shapiro

[57] ABSTRACT

An improved vehicle or other object-tracking and location system, preferably, though not essentially, of national scope, wherein transponder or transceiver-equipped stolen or missing vehicles or other objects may be located and/or tracked, as by appropriately-equipped police direction-finding tracking vehicles, through homing-in on periodic transponder reply radio transmissions automatically activated by command activation signals broadcast on the same carrier frequency as the transponder reply signals and with encoded vehicle identification information that causes the intended vehicle transponder so to reply, and with provision for modifying the command signals to require an increased rate of periodic transponder reply signal transmission to assist homing-in on the selected vehicle. In a preferred mode of operation, the verification of whether the reportedly missing vehicle is thus transponder-equipped is preferably established by querying the FBI-NCIC computer system, which will provide the said coded vehicle identification information and automatically cause the appropriate sector or area to broadcast said command activation signals.

3 Claims, 7 Drawing Sheets

APPARATUS FOR LOCATING AND/OR TRACKING STOLEN OR MISSING VEHICLES AND THE LIKE

This is a divisional patent application of U.S. Ser. No. 8947,152, filed Mar. 31, 1986, now U.S. Pat. No. 4,818,998, granted Apr. 4, 1989.

The present invention relates to methods of and systems and apparatus for tracking stolen or missing vehicles and the like, being illustratively described in connection with its important and perhaps primary application to the recovery of stolen or missing automobiles and the like.

In Letters U.S. Pat. No. 4,177,466 of common assignee with the present invention, an automobile theft detection system was proposed involving the concealment in protected automobiles or other vehicles of radio transceivers or transponders responsive to radio signal transmissions sent when vehicles are missing, and modulated with a code corresponding to the missing vehicle identification; each particular missing vehicle transponder transmitting the same transponder locator signal when its identification code is received for tracking by a police or other direction-finder vehicle. To implement a system of this character in practice, however, far more sophisticated techniques and safeguards are required, including the use of a single frequency for all transmissions and the problems of time-sharing dictated thereby, with protection against transponder transmission while other transmissions on that frequency are in progress; adaptability for varying the rate of transponder transmissions once initiated by request of the operator of the tracking receiver to provide faster or stepped-up periodic reply signals for homing-in on the vehicle; discrimination of different vehicle transponder reply transmissions for tracking; checks to insure against false transponder activation; and the solution of other practical usage problems such as the required police or other identification information storage and networking requirements for a universal, nationwide and/or at least statewide system.

An object of the present invention, accordingly, is to provide an improved and highly practical method of and apparatus for locating and tracking stolen or missing vehicles and the like that, while employing prior underlying concepts of unique signal code-responsive transponders, provides the added sophistication, security and practical techniques found essential to enable a commercially useable universal system.

A further object is to provide such a system wherein, for the case of automobile theft, the vehicle owner need only report the theft, after which the entire system operates under the direct control of law enforcement equipment and personnel, with the system virtually insensitive to disarming or accidental activation.

Another object is to provide an improved transponder apparatus for identifying an object or vehicle with which it is associated and, where and if desired, permitting location of such object or vehicle.

It is a further object of this invention to provide such a transponder which broadcasts at a variable rate a reply code specific and unique to that transponder to establish its identity.

It is a further object of this invention to provide such a transponder for which such broadcast rate is externally controllable.

It is a further object of this invention to provide such a transponder which permits individual location of simultaneously broadcasting transponders on the same reply frequency.

It is a further object of this invention to provide such a transponder apparatus which can receive an activation code and transmit its reply code on the same frequency.

The invention results, in part, from the realization of a truly effective vehicle transponder that can detect encoded information, provide a reply code specific to the transponder, discern the presence of a specific identification code and a broadcast rate command in the encoded information, and determine the transmission period for the reply code based on the broadcast rate command.

Other and further objects will be explained hereinafter and are more fully delineated in the appended claims.

In summary, however, from its overall aspect, the invention embraces a method of tracking a computer-registered transponder equipped vehicle and the like, upon the same being missing, that comprises, checking the registration of such vehicle to determine that it is computer listed as transponder-equipped; upon affirmative determination of such transponder equipment listing, initiating the broadcasting in an appropriate sector of a radio activation command signal carrying coded identification unique to said vehicle and its transponder; receiving said command signal at the vehicle transponder, decoding the identification and verifying that the same is the unique code of said vehicle and its transponder, and, if so, causing the transponder to become activated to transmit periodic vehicle reply signals including unique identification; receiving said periodic vehicle reply signals in a tracking vehicle and locking onto the same; thereafter, at the request of the tracking vehicle, modifying the said sector radio activation command signals to provide increased-rate command signals to the vehicle transponder; and responding to the increased-rate command signals at the vehicle transponder to increase the periodicity of the transmitted transponder vehicle signals to facilitate tracking by the tracking vehicle.

From other viewpoints, the invention also involves a novel transponder apparatus for use in identifying the presence of an object interrogated by broadcasted radio activation command signals on a predetermined RF carrier carrying coded identification unique to that object and its transponder, the apparatus having, in combination, means for receiving said command signal and for decoding the identification and verifying that the same is the unique code of said object and its transponder; means operable in the event of such verification, for activating the transponder to transmit periodic reply signals on the same carrier frequency and including unique identification thereupon; and means responsive to further command signals requesting a variation in the rate of such reply signals for thereupon transmitting the reply signals at such varied rate.

From still another aspect, the invention provides a transponder apparatus which detects encoded information, discerns the presence of its specific and unique identification code and a broadcast rate command in the encoded information, and transmits a reply code specific to the transponder, while determining the next time of transmission of the reply code for periodically repeating such reply transmissions. In one construction, the transponder monitors RF command signals for predetermined encoded audio signal carried by the broadcast signal. The audio signal conveys encoded digital information using different audio frequency signals or tones, to define the information, which typically includes a broadcast rate command for the transponder replies and an identification code specific and unique to that transponder (although in certain instances a universal identification code such as a universal test code may be substituted for the specific identification code). The transponder converts the digital information into digital logic signals and, if the specific identification code is present, broadcasts a reply code, specific to the transponder, repeatedly at a rate determined by the externally controlled broadcast rate code command, which may be changed to vary the transponder reply rate. Mutual interference with both reception and transmission is avoided with the preferred single carrier frequency employed, by pseudo randomly varying the transmission period. A number of activated transmitters, moreover, can broadcast simultaneously on the same RF frequency as well as monitor that frequency for additional commands.

And, in another feature, the invention further provides a transponder vehicle tracking apparatus having, in combination, direction-finding means for receiving activated vehicle transponder periodic radio reply signals carrying vehicle identification code information; signal and microprocessor means for demodulating said identification code information and for alpha-numerically displaying the same; means also responsive to the last-named means for simultaneously displaying both the bearing from which the transponder reply signals are received and the signal strength thereof; and means for locking onto and displaying only radio reply signals of a selected vehicle transponder.

Mention should also be made of the feature of using non-volatile memory to remember the state of the transponder so that if electrical power should be removed after activation, when electrical power is restored to the transponder it will continue to transmit a reply code without need for re-activation.

Preferred and best mode embodiments and apparatus details are later explained. The invention will now be described with reference to the accompanying drawings, FIG. 1 of which is a system diagram of the preferred vehicle location system application of the concepts of the invention;

Figure 1:
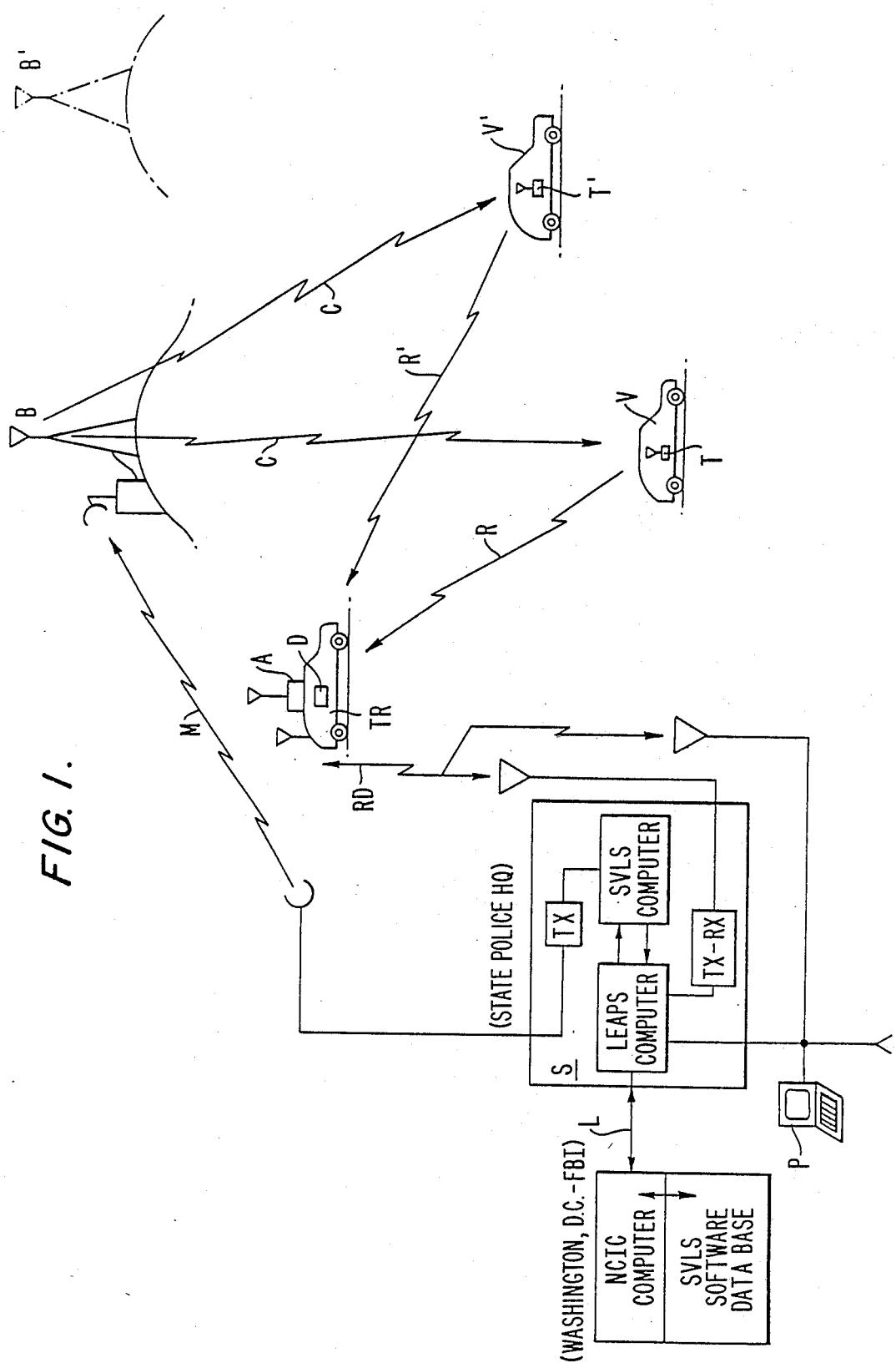

A description, first, of the overall philosophy and methodology underlying the total system operation of the invention in preferred form is in order, with reference to the system diagram of FIG. 1.

When a vehicle V (or V') equipped with the transponder T (or T') of the present invention is lost, the owner reports that fact to the local police department which, in turn, reports to a state computer station system S. In tests in Massachusetts, this system, as later explained, is termed LEAPS. This information is sent, as a matter of course, from station S, as by telephone network or link L, to a master computer file, preferably maintained, for example, by the National Crime Information Center (NCIC), a part of the FBI in Washington, D. C., (or at other suitable computer facilities) and whereat it is intended to have in storage (SVLS—stolen vehicle location system), a list of the vehicle identification numbers of registered subscribers to the theft system of the invention. Every stolen car report that comes in, will be checked against the subscriber list (SVLS data base), and if a match is found, a computer message will be sent back at L to the originating station S, with a set of information that includes a unique activation code and a unique reply code for the transponder of the stolen vehicle, and a description of the vehicle. This information, now at the computer (LEAPS) at location S, is used to cause a controlling computer (SVLS computer) to set up a transmission schedule and, as by microwave link M, initiating the transmitting of the activation code from a series of radio broadcasting transmitting antennas B (B'), operated sequentially or if sufficiently spaced, simultaneously or in slave fashion, thereby causing the stolen vehicle transponder, if in the area or section, to activate with a certain probability. The activator code is broadcast periodically (schematically shown at C) until a report is received that the car has been retrieved or until some predetermined time interval has been exceeded. These activation command signals, broadcast at C, have the activation code of the vehicle transponder, check-sum digits, and certain command bits that cause turn-on, turn-off and speed-up, as later explained.

As before stated, the frequency of the broadcast transmitters is the same as that of every vehicle transponder; namely, for example, a nationally assigned VHF law-enforcement frequency. But each transponder T (T') transmits a digital coded response or reply of about a tenth of a second duration, periodically and preferably at pseudo random intervals, say, once every ten seconds, roughly. In accordance with a feature of the invention, however, if the transponder detects another transmission on the frequency, it waits until that message is completed and then commences its reply transmission.

A police or other tracking vehicle TR, appropriately equipped with a direction-finding antenna system A and a tracking receiver and display D, when within range of the missing vehicle, will display on an indicator panel the coded response of the vehicle transponder, received along schematic path(s) R (R'), a five-digit alphanumeric code corresponding to the code being transmitted by the vehicle transponder T (T'). When the police officer sees that display at D, the officer calls into his radio dispatcher, via RD, who puts an inquiry at P into the state computer (LEAPS) and inquires as to the status of that code. If it turns out that this is a vehicle that is stolen or that it is otherwise desired to track, then the sector broadcast transmitters B (B') will be activated to send out a different transmission C distinguished from the first activation signals to vehicle transponders T (T") in that it represents a request to increase the periodicity or rate of vehicle transponder responses or replies. The second, step-up or speed-up reply request command signals C will have the same vehicle identification number. It may or may not have the same check-sum bits as the first type activation command signals, ut it will have a different code in the command section of the message, causing the speed-up, as opposed to just turn-on.

When the vehicle transponder receiver receives this increased rate command signal, the transponder circuits will cause the transmission of the coded reply or response message signal from the transponder vehicle to be accelerated to a faster rate of transmission, say about once per second, along R (R'), so that those in the tracking vehicle TR, instead of seeing the coded number once every ten seconds on the display, will see it once every second or so to aid in homing-in. The transponder will stay in that speeded-up mode for a period of time, say 30 minutes, and then automatically return to the regular mode of transmitting once every ten seconds, the expectation being that within a half hour, the vehicle ought to have been recovered.

If recovery has not been made, the tracking vehicle can always ask for the speeded-up vehicle transponder reply command request to be broadcast again at B (B').

At the tracking vehicle TR, not only are vehicle transponder reply codes displayed, but a lock select or control (button, for example) is provided at D to cause the computer processor in the tracking device to display only signals with a particular reply code from a particular vehicle transponder, to the exclusion of other vehicle transponder signals as from other stolen vehicles in the area. In addition to the reply code display, the tracking vehicle installation is provided with a direction indicator such as a circle of light-emitting diodes that gives relative bearing or direction of reception of the transponder signals. The direction-finding system at the tracking vehicle preferably employs four roof antennas A, later discussed in connection with the embodiment of FIG. 6, that are electronically phased to determine the incoming signal by determining the Doppler shift, as is wellknown, and providing the bearing indication.

In addition to the bearing indication, a bar-graph indicator is further provided at D that shows relative signal strength and thus a rough indication of range. This is important in tracking, particularly in urban environments where the signal can bounce off a building or other vehicles and trucks that may be close by. The signal that comes from the direction of the stolen vehicle will usually be the stronger; so that if the tracker sees the signal strength display in erratic mode, the direction of maximum signal strength is followed.

The tracking vehicle personnel, as they home-in, thus know the relative direction, the relative signal strength and a complete description of the vehicle being sought; and, of course, other information that may be pertinent such as whether the car may have been involved in an armed robbery or some other important aspect. After finding and securing the sought vehicle, the personnel of the tracking vehicle will report that the car has been retrieved so that the system may cancel the stolen car report in the NCIC and other computer files. Again, in accordance with preferred features of the invention, this is also automatically effected, with the software at NCIC checking and issuing a new set of command instructions which causes the turn-off of the command signals previously broadcasted in the search sector Other aspects of preferred refinements in the best mode of practice of the system of the invention include the following. Messages that come in to the computer controlling the broadcast transmitters are queued up before being transmitted because it takes a certain amount of time for the transmitter to build up to full intensity, which amount of time is of the same order of magnitude as the messages-to-be-sent. The sector broadcast transmitters will send out their activation signals and codes on a periodic bases, perhaps once an hour or so, as before indicated, until the vehicle is either recovered or a certain period of time has gone by, which may, for example, be set at a month.

From a practical viewpoint, it is important to have some way of checking out the transponder system once it is installed in the car. This may be effected by an installation test unit, later described in connection with the functional or operational diagram of FIG. 5. This installation test unit is capable of sending a signal to the transponder receiver portion T-RX which the transponder recognizes as a signal coming from the test device and which causes the transmitter section T-TX of the transponder T to go into a low power mode, in response also to another safeguard signal that it picks up on it's DC power line, simultaneously.

In this preferred nationwide cooperative system illustrated in FIG. 1, (though the invention is also useful for smaller sectors, states, group of states or other sector sub-divisions as well), thus, each vehicle transponder or transceiver assembly is part of a national (or at least wide-area) stolen vehicle location system, as above indicated, shown as preferably coordinated with the National Crime Information Center, NCIC.

When a vehicle such as automobile(s) V (V') is reported stolen, information such as the license is entered through terminals P at any of a number of terminals disposed throughout the area being monitored, such as in local police stations or other municipal buildings, all such cooperating with the before-mentioned LEAPS computer which has access to information as to the manufacturer's vehicle identification number, description, etc. This is a procedure followed in recent testing of the invention in Massachusetts. The LEAPS computer interacts via L with the SVLS data base, to determine if the vehicle is equipped with a vehicle transponder T according to this invention. The vehicle identification number is sent through the federal communications telephone or other networking L to the NCIC computer in Washington, D.C., where, according to the preferred mode of the invention, once the vehicle is identified (from comparison with stored data) as a subscriber equipped with such transponders, the SVLC software accesses the SVLS data base at NCIC to determine the unique activation code for the vehicle V (V') and the unique reply code which that transponder will broadcast upon activation. The activation code and reply code information are returned automatically through network L to the LEAPS computer which engages the SVLS computer and as through microwave control link M, relays the code information to the radio transmitter at B to broadcast an RF carrier command signal containing on its carrier frequency the vehicle activation code and including the specific unique vehicle identification code and a command for the transponder to reply at a particular rate.

Let it be assumed that vehicle transponders T and T', hidden within cars V and V', respectively, are both in range of sector activation transmitter B, as shown. Only transponder T, however, will respond to the unique identification code broadcast along C by transmitting antenna B. Upon activation, transponder T then broadcasts its reply code unique to it which is then received at D by the tracking vehicles such as a police cruiser TR. The code name for car V is thus displayed on a console at D. The tracking officer relays this code name along radio link RD to the police dispatcher, who accesses the LEAP and SVLS computers at S to obtain a description of the vehicle V, which is then radioed back to cruiser TR so that the officer can visually identify the vehicle V.

As before stated, homing-in can be facilitated by step-up or increase of the periodicity of transponder reply signals as the tracking cruiser enters the vicinity of the stolen vehicle V. By requesting such speed-up via link RD, the SVLS will control the before-mentioned increased rate request, causing the signals broadcast at C to command such step-up in transponder reply rate.

Figure 2:
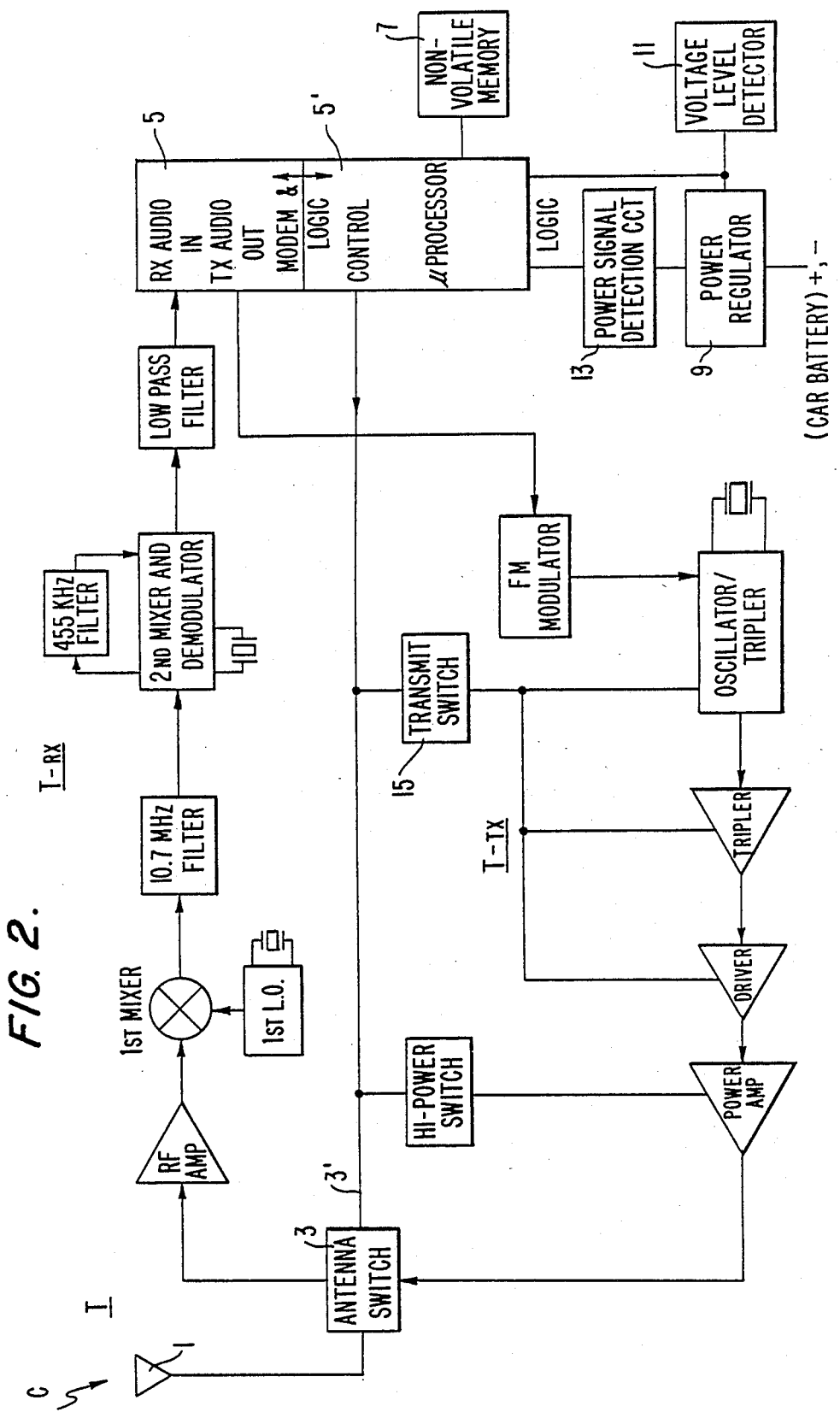
FIGS. 2 and 4 are block circuit diagrams of a transponder or transceiver apparatus particularly designed for use in the vehicles-to-be-tracked in the system of FIG. 1.

Turning, now, to details of preferred implementation of the various components of the system of the invention, a useful transponder or transceiver configuration T is illustrated in FIG. 2, wherein an antenna 1, hidden in the vehicle V (as inside the seat backs, dashboards, etc.), is connected to a switch 3, such as conventional PIN diodes or the like, for switching the antenna to the receiving or transmitting circuits of the apparatus at appropriate times.

Assuming that the switch 3 is in the receiving function, the antenna 1 is then connected to an RF amplifier and then a mixer so-labelled, which, with the mixing of a local oscillator (1st L.O.), takes the carrier frequency of the activation command signals C broadcast by B (B') down to a first intermediate frequency, say from a specified VHF carrier (narrow-band FM audio FSK signal) to an intermediate frequency of 10.7MHz. This is filtered and then applied to demodulator, so-labelled, that basically extracts the audio from the signal. That audio comprises two tones, one of which corresponds to a logical "zero" and the other of which corresponds to a logical "one". The purpose of the modem 5 receiving these filtered tones is to convert the tones into digital voltage levels, corresponding to the "zero" and "one". The converted logic levels are applied to a microprocessor 5' which serves as a control device.

When the vehicle code has been identified, as later explained, and it is desired to reply or respond with unique vehicle code periodic transmitted signals, as before explained, the microprocessor 5' generates logical levels which it then feeds to the modem 5 to convert those logic levels back into tones which are fed into a modulator so-labelled, in the transmitter (bottom) portion of FIG. 2. The modulator modulates the transponder transmitter T-TX consisting of an oscillator, a frequency tripler to bring the frequency to that of the input command signal carrier. The transmitter is a driver and a power amplifier (power amp), adapted to feed the transponder antenna to transmit the reply signals R (FIG. 1) on the same carrier frequency as the broadcast activation command signals C, when the switch 3 connects to the power amplifier under the control (via 3') of the microprocessor 5'. A high-power switch (Hi-power), is also shown controlled by the microprocessor 5' to bypass the last-named power amplification stage (power amp) so that a mode for low-power test and installation transmissions is provided.

Figure 3:
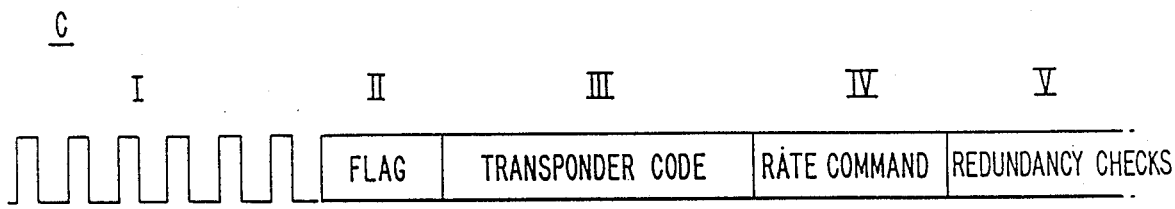
FIG. 3 is an encoded information sequence useful with the system.

An example of coded information originally carried by the broadcast command activation signals C as FM-modulation and received by the vehicle transponder T is shown in FIG. 3. The preamble I comprises initially sequential digital logic "ones" and "zeros" which allow modem 5, before mentioned, to synchronize with the signal. The next block II, labelled "Flag", indicates the commencement of the following data frame containing the information conveyed by the two audio tones (say, of 1200 and 1800 Hz frequency) representing logical "ones" and "zeros". When the signal C is intended solely for the transponder T of missing vehicle V, the transponder code III represents the unique digital address for transponder T. The rate command portion IV is an activation command, a deactivation command, or a step-up transponder reply periodicity command represented by one or more values in binary form. Lastly, the frame may further include conventional redundancy checks V, shown dotted, such as cyclic redundancy checks, vertical redundancy checks, or longitudinal redundancy checks which permit error correction and detection of transceiver code III and rate command IV.

Using the code information of FIG. 3 as exemplary, the corresponding encoded information may be traced through the transponder circuit of FIG. 2, as follows. When the FM-RF signal C having the preselected carrier frequency is received, the same is demodulated, as before explained, producing the carried audio signals representing the desired digital information. The modem 5 converts the audio signals into digital signals, as previously stated, and microprocessor 5' receives the digital information when the audio signal is, say, in the range of 1100 to 1900 Hz. The modem 5, such as, for example, Type 409 of MX-COM Inc., of Winston-Salem, N.C., outputs a logical "one" for one cycle of 1200 Hz, and a digital "zero" for one and one-half cycles of 1800 Hz in the above example. Microprocessor 5', such as, for example, Type MSM5840RS of OKI Semiconductor, Inc., Santa Clara, Calif., processes the encoded digital information as follows. A non volatile memory 7, such as an EEPROM (electrically erasable programmable read-only memory) or other PROM cooperates with the microprocessor 5' and contains the specific vehicle transponder identification code, to be compared with the encoded digital information III, FIG. 3, and the matching transponder reply code. To conserve power, this memory 7 is provided with power only when retrieval of its information is required. In combination with the feature that intermittent or periodic transponder reply signals are generated only upon command, as described, the transponder efficiently conserves power. The car battery +,− or other battery provides power at twelve volts to a power regulator 9 which maintains a five-to-six-volt power output to the microprocessor 5'. A voltage level detection circuit 11 resets the microprocessor 5' when the voltage drops below a predetermined voltage, thereby allowing it to complete routine housekeeping while sufficient power remains. As an example, the most recent rate command can thereby be stored in the non volatile memory 7 before power is totally lost.

For testing purposes, the microprocessor 5' may broadcast a test reply signal when a universal RF test signal is received simultaneously with an electrical signal of predetermined special frequency on the unit's D.C. power supply (as detected by a power signal detection circuit 13). The special signal is of frequency high enough so that the impedance of battery +,− does not interfere with signal detection, and low enough so that a test signal does not create RF interference. The special electrical signal is required so that the test device cannot be used by an authorized person to locate cars equipped with the transponder of the invention.

Returning to the normal operation, when the proper identification code is received, microprocessor 5' recalls its specific reply code from the nonvolatile memory 7, stores it in RAM, and submits the information to the modem 5 which converts the digitally encoded information back into an audio signal. As before explained, with antenna switch 3 disabling connection to the receiving part (T-RX) of the transponder, the transmitter portion (T-TX) on activation of the transmit switch 15, under control from the microprocessor 5', transmits on the same carrier frequency the reply FM signals carrying the audio code reply signal; but only if the microprocessor 5', controlling antenna and transceiver switches 3 and 15, does not receive indication from modem 5 that the receiver portion is still receiving a transmission on the carrier frequency; otherwise, the control signal awaits absence of such carrier frequency. As before stated, the use of the non-volatile memory enables the transponder to continue replying after an interruption in replying caused by power failure.

Figure 4:
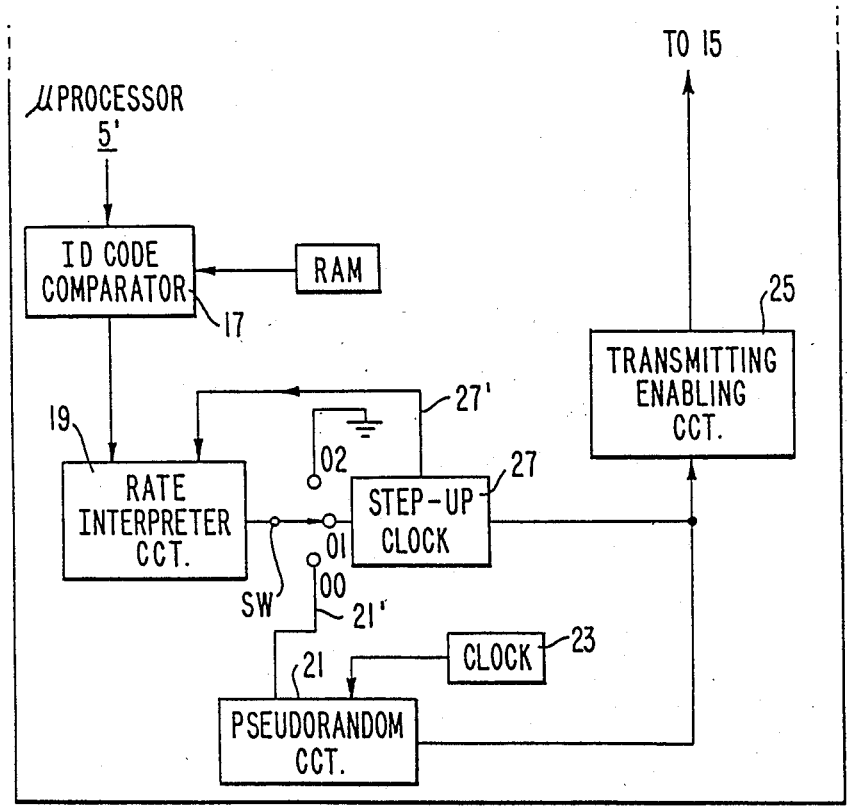

The microprocessor 5' includes an operation for interpreting the broadcast rate command when received with the identification code specific to a particular vehicle transponder T. A schematic implementation of this part of the operation in hardware form is shown in FIG. 4, such being considered as effectively incorporated in the processor 5' of FIG. 2. In actual practice, of course, conventional software control will be provided, the hardware explanation, however, more facilely describing the operational functions. Specific identification (ID) code comparator 17 matches the received identification code with the identification code stored in RAM, after it is accessed from the non volatile memory 7 of FIG. 2. If the identification codes match, the broadcast rate command is provided to rate interpreter circuit 19 which selects a reply broadcast rate at switch SW. If the rate command is "00", FIG. 4, for example, pseudo random generation circuit 21 is accessed, this circuit periodically receiving a pulse from a clock 23 and delaying signalling transmitter-enable circuit 25 by an additional amount of time represented by a pseudorandomly generated number. For example, clock 23 may provide a pulse every 8 seconds, and circuit 21 may generate an additional delay period of 0 to 4 seconds, resulting in the about once per ten second rate of periodic reply signals as the enable circuit 25 is signalled to command transmission of the replies.

When a step-up or increased reply rate command is received ("01"), such as after a police cruiser nears the stolen vehicle, a step-up clock 27 is accessed, as by switch SW effectively moving to the position shown in FIG. 4, the clock 27 generating a pulse at short, regular intervals, such as once every second, which triggers enable circuit 25 to continue transponder transmission at that rate and also steps up the pseudo random circuit.

After a predetermined period of time, clock 27 signals rate interpreter circuit 19 through line 27' to return to the normal broadcast rate (SW position "01"), whereupon normal reply activation rate continues until a deactivation command "02" is received, at which time switch SW contacts ground to cease transmissions.

Figure 5:
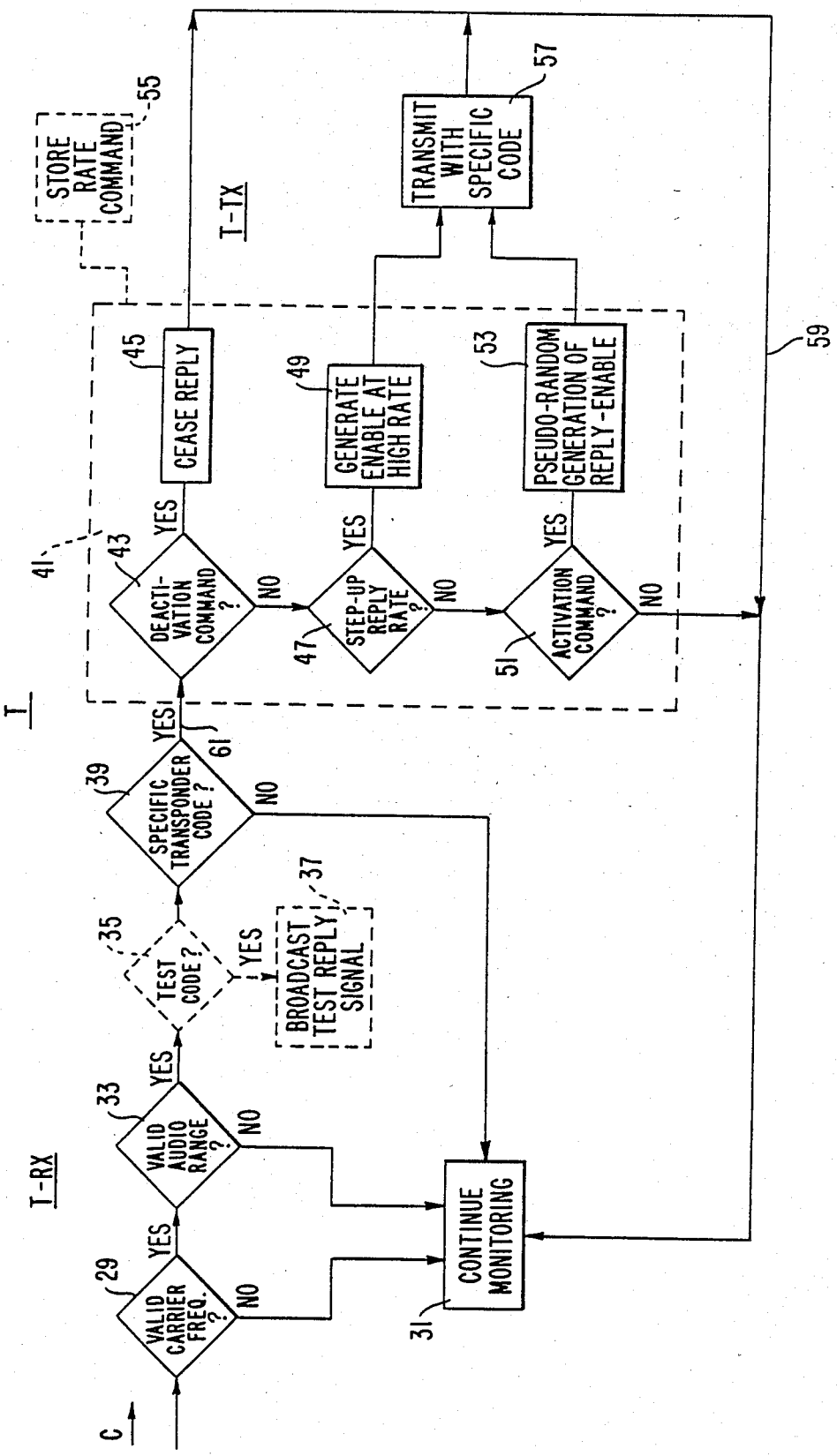
FIG. 5 is a flow chart of the operation of the receiving and transmitting functions of the transponder of FIGS. 2 and 4.

One suitable operation logic for the transponder T is shown in FIG. 5. In receiver T-RX, the frequency of the incoming carrier signals C is monitored, represented by operational step 29, and unless received, the monitoring continues at step 31. If the received carrier frequency is valid and the audio signal thereupon is within the preselected frequency range, step 33, the encoded information enters the modem 5 and microprocessor 5' for processing (RX-AUDIO IN, FIG. 2).

The transponder may include a testing feature, indicated in dotted lines as step 35, where an RF test signal carrying a test code within the correct audio range may trigger the transponder T-TX to broadcast a test reply signal, step 37. For test step 35 to be satisfied, a preselected signal detection circuit 13 of FIG. 2, earlier described must detect the appropriate signal on the D.C. power line.

If the testing feature or the criteria for entering its subroutine are not present, the specific transponder code for the vehicle V is recalled from memory in step 39 and compared to the converted audio tone digital information on the incoming signal. When the specific transponder code is not present, monitoring continues, step 31; but if the specific transponder code is discerned, the rate command is relayed, line 61, and is distinguished within the transmission command procedure 41 to determine transmission of the reply code by the transponder transmitting portion T-TX. When a deactivation command is present from the broadcast signal C, step 43, the transponder T ceases broadcasting replies, 45, and then, as indicated by line 59, resumes monitoring, step 31.

The presence of the transponder activation command of broadcast signal C is determined in step 51, and of the reply rate step-up request command, at 47. The transponder is activated to reply, or it receives the step-up rate command to replay at a greater periodic rate. The step-up command, as before explained, may remain in effect until a deactivation command is received or until a predetermined period of time has elapsed.

When the activation command is received, a broadcast-enable is generated pseudo randomly, step 53, at an average rate which is slower than the step-up rate; for example, "enables" may be generated in step 49 once every second, as before discussed, whereas the normal reply "enable" may be generated, step 53, once every 10 seconds or so, including plus or minus a random number, thereby minimizing the chance of overlap with the reply broadcasts of other activated transponders. Preferably, after each new rate command is received, it is stored in non volatile memory, shown dotted at 55, and corresponding to the memory 7 of FIG. 2. Conventional error correction and detection can be performed on the incoming data in steps 39 and 41 by means of well-known vertical, longitudinal, and cyclic redundancy checks, as previously mentioned.

Figure 6:
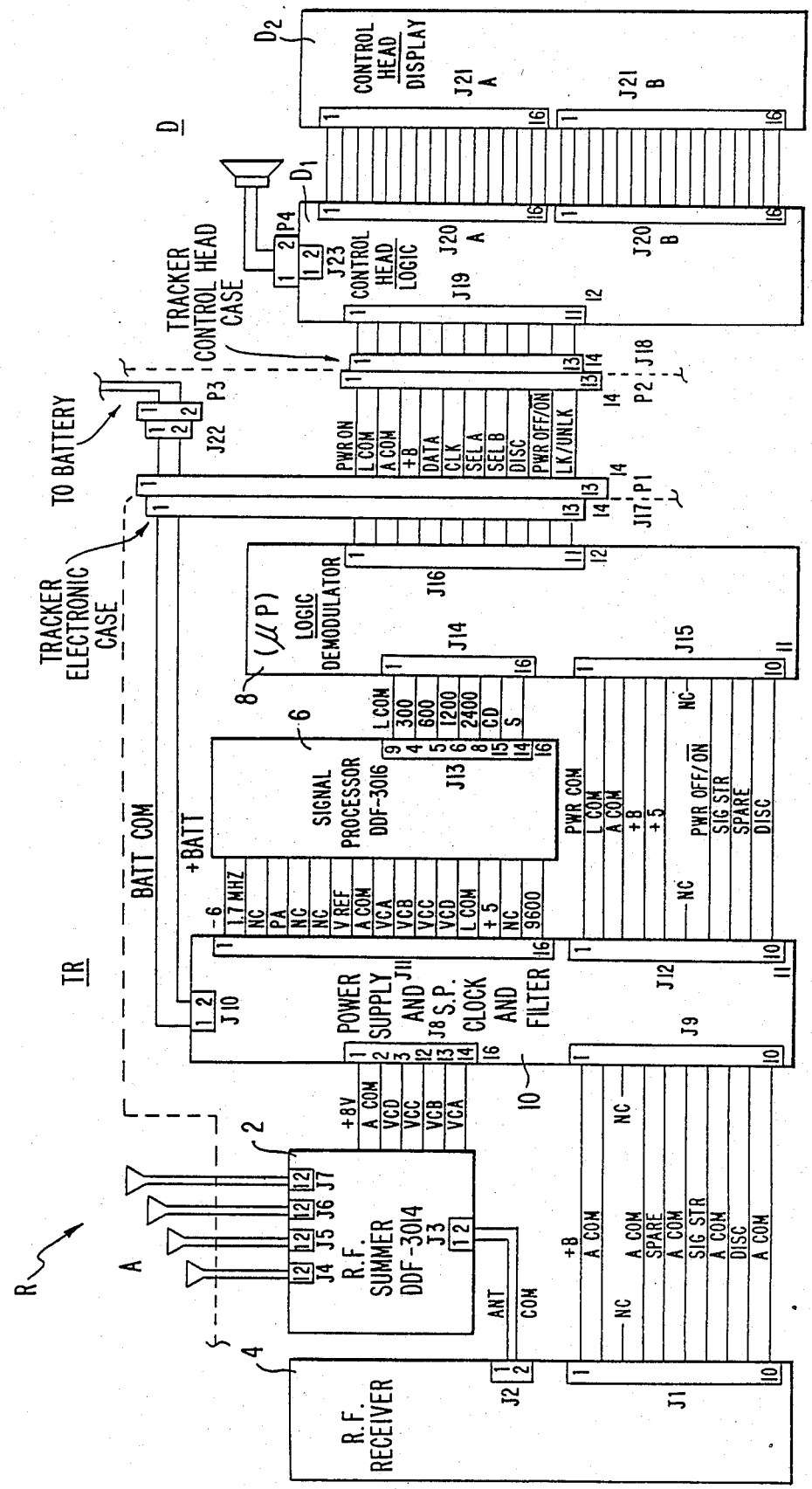
FIGS. 6 and 7 are block circuit diagrams of a preferred vehicle tracking receiving and display systems for homing-in on the reply signals of the transponders of FIGS. 1, 2 and 4.

It is now in order to examine the necessary type of circuits for the tracking vehicle receiver equipment TR, FIG. 1, a preferred form of which is illustrated in FIG. 6. The tracking receiver has two main parts; a radio-receiving, power and processing portion; and a display, portion D. The receiving portion comprises an RF summer 2 that multiplexes the inputs from four antennae of the tracking vehicle direction - finding antenna system A (FIG. 1): J 4, J5, J6, and J7. The sum of the four inputs generates the signal from which the user is able to determine the direction of either a vehicle transponder T being tracked or any device that may be jamming the vehicle/transponder. The summer output contains the very high frequency carrier signal of the vehicle transponder coded reply with response signals and is fed to a narrow band FM receiver 4 which "strips off" the information-carrying signals in the audio range (1200 and 1800Hz and the Doppler modulation frequency from the direction-finding, such as 422 Hz), and supplies that demodulated audio signal to the tracker's microprocessor and signal processor 6. The microprocessor portion decodes the reply code of the vehicle being tracked and the signal processor determines the car's direction, as later discussed.

The receiver also provides the signal strength level that indicates the stolen car's distance from the tracking vehicle, as also hereinafter more fully explained.

The power for the tracking receiver, which may range from 11.5 to 14.5 volts, is supplied by the police or other tracking vehicle in which the device is mounted. The power supply, and SP clock and filter circuit board 10 supplies all the power necessary for the functioning of the tracking device, contains the master clock for the signal processor 6, and does some preliminary filtering of the signal for the signal processor.

The signal processor board 6 has two functional parts: a control voltage waveform generator and an audio signal processor. The control voltage waveform generator portion provides the signals (VCA, VCB, VCC, VCD) that are necessary for the RF summer 2 to multiplex smoothly from one of the four antenna signals to the next, in conventional fashion. These four signals, which are all identical, are shifted 90 degrees according to a precise curve calculated from PROMs contained on the board. The audio signal processor portion, on the other hand, takes the filter signal from the power supply board and performs additional filtering, which serves to make apparent the before-mentioned Doppler shift that indicates the direction of the car being tracked.

The primary function of the logic/demodulating board 8 is to take the signal strength from the receiver 4 and convert it into digital form. It performs that function by demodulating the received signal into a stream of 0 and 1 bits that contain both the reply code of the car being tracked and a number of error detection and correction bits. The logic board also reads and controls the system display D.

That display/control portion D, which may be mounted on the dashboard of the tracking police car, contains two boards: one for display logic ($D_1$) and one for the display ($D_2$).

Figure 7:
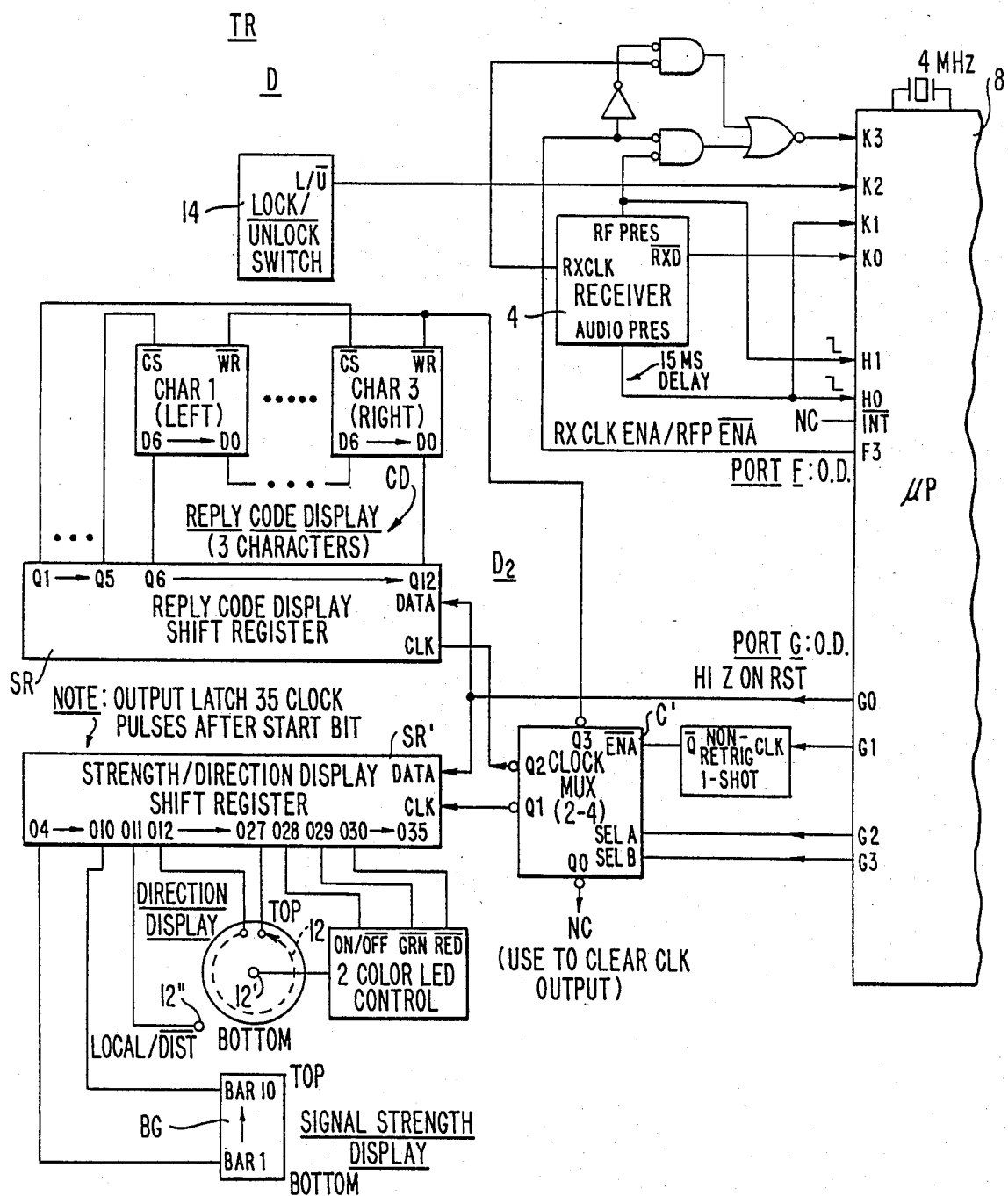

The display $D_2$, more particularly delineated in FIG. 7, consists of an array of LEDs, arranged in a circle 12 and representing compass points, as well as a central LED 12' that serves as a point of reference (particularly at night) for those around the circle's edge. There is also a bar graph BG with LEDs that indicate relative signal strength by the height of the lighted display. Another LED 12 placed next to the bar graph BG indicates whether the bar graph display is on the local or distant display range.

At the upper center of the display is a 5-character alphanumeric display CD that shows the reply code of the car being tracked.

There is also a lock-unlock switch 14 that enables the user to lock onto a particular reply code. When the switch is not in the lock position, each code from all of a multiplicity of vehicle transponders within range of the tracking vehicle shows for one second.

The preferred alphanumeric display at CD is effected from data clocked from the microprocessor 8 (GO, FIG. 7) into a pair of 8-bit shift registers SR, the first bits controlling which of the LED dot-matrix display unit of CD are used to display a given character (left), and the following comprise the code for a given character, so as to produce an alphanumeric display containing the unique code or serial number of the vehicle transponder which is sending the reply signals R to the tracking vehicle. In a practical implementation, a thirty-five bit shift register SR', controlled by clock C', which is in turn supplied with control outputs $G_1$-$G_3$ from the microprocessor logic demodulator 8, receives information for the compass point LED display 12, the on/off (power) control LED 12', the local/distance LED 12" and the bar graph BG—all as clocked sequentially into the shift register SR'. On the 36th clock pulse from the clock C', the data is latched and outputted to the appropriate LED's.

In summary, when the tracking vehicle equipment TR is turned on, but is not receiving a signal, the direction indicator display 12 (FIG. 7) is blank, the signal strength indicator display BG reads 0, and the code display CD is blank. In this mode, any received vehicle transponder signal R of proper carrier frequency will trigger the TR. When such a signal is received, the tracking indicator 12 illuminates to show the bearing of the received signal and the signal strength indicator BG indicates a relative signal strength value.

If the received signal is a coded vehicle transponder signal, a five character identifier for that vehicle transponder appears in the digital display CD. As the tracking vehicle approaches the vehicle, the signal strength increases. If the distance is increasing, the signal strength will decrease. In urban areas and other places where there are standing waves and reflections, the signal strength may not give a reliable indication of relative distance at all times, but provides homing-in assistance eventually. In case more than one vehicle transponder is being received, the lock switch 14 can be operated when the desired vehicle's code identifier is displayed at CD. This causes the TR to track only that specified vehicle. When, moreover, the TR displays a normal message from a vehicle transponder, the center LED 12' of the direction display is illuminated.

Figure 8:
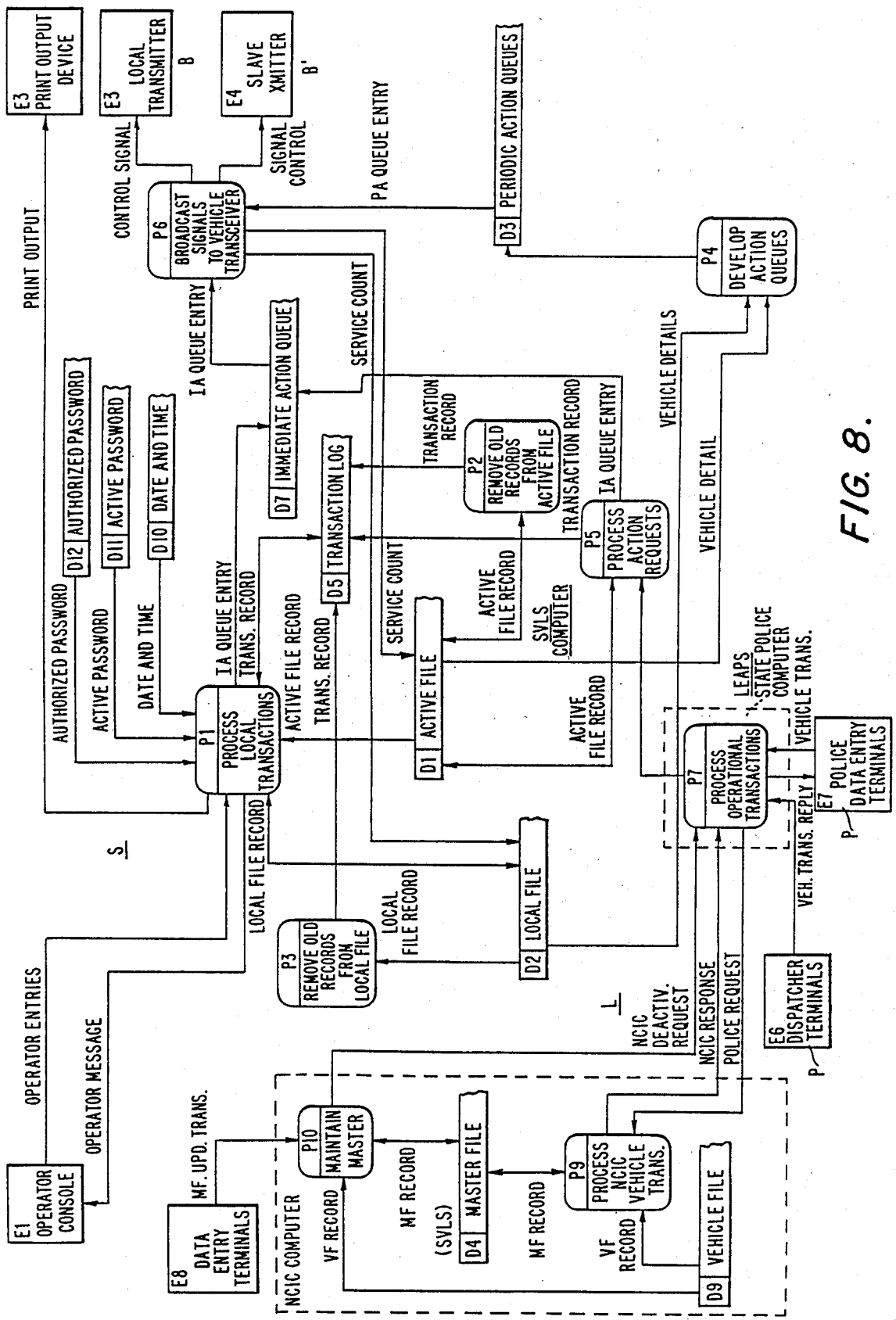
FIG. 8 is a data flow diagram of the sector activation computer-controlled broadcast command system providing radio signals to interrogate and activate the vehicle transponders of the invention.

Finally, the data flow operation for the sector activation transmitter(s) B (B', etc.), FIG. 1, will now be addressed, with reference to FIG. 8 and with common letter part identification with FIG. 1, and with the assumption that the operation will be a national system with NCIC reports on stolen vehicles which go into the national vehicle file DG at NCIC. The stolen vehicle report is entered by local police and dispatcher terminals P (E6, E7) to the state LEAPS computer (P7) which communicates with NCIC along lines L as discussed in connection with FIG. 1. With the implementation of the present invention, NCIC also would store from data entries E8 and master file up-dating P10, the master file D4 of vehicles equipped with the transponders of the invention, labelled "SVLS data base" in FIG. 1. If the reported vehicle was equipped with the invention, NCIC would send back at L not only their normal reply, but an extra message giving the transponder activation and reply codes of the reported vehicle so that this vehicle transponder may be activated for tracking. The state police computer (LEAPS of FIG. 1) would pass that request to the SVLS computer of FIGS. 1 and 8 linked up with the terminals of all the police agencies in the state and receiving (from P7 to P5) request for P5 to process such activation request (or a deactivation when the police recover a stolen vehicle and report such). When P5 receives such request, three things happen. First of all, the request is logged at D5. Then an entry is put into a queue D7 for immediate action, with such queue being serviced, say, one entry every 15 seconds either to broadcast activation command signal C or to place the request into the periodic action queue D3. Such activation signals will be broadcast unless there are others waiting, in which case, it has to wait its turn. Thirdly, the request is received in an active file D1 which consists of all business relating to activations and de-activations that are currently in process. An activation request goes into the file D1 for, say, 30 days, so that over the next month, activation command signals will be broadcasted. Deactivations are handled the same way, although the time limit may be only 24 hours.

Function P2 removes records from the active file D1 older than 30 days if they are not active; and other than 24 hours, if they are not active, logging its activity. P6, which represents the broadcaster control signals developed by SVLS Computer, services the immediate action queue D7 once every 15 seconds as earlier mentioned, and causes the periodic sector broadcast command signals C to be transmitted from a local transmitter E3 and/or slave transmitters E4 (B and B' in FIG. 1). The P4 (develop action queues function) operates every hour to renew the active file D1 and a local file D2, later described, and an hour's worth of broadcasting material. Old records may be removed from the local file at P3.

The below-mentioned local file D2 contains data which comes from P1 (process local transactions) originating at the console E1 of the SVLS computer, containing a file of vehicle transponders which have been entered locally as for test and other special purposes. The console E1 itself is protected by a system of passwords (D12, D11) and date and time entries (D10) so that unauthorized commands cannot be entered. Conventional print-out may be available as at E3.

While necessary and designed particularly for the purposes of the present invention, the transponder apparatus of the invention may also more generally be employed where transponder or transceiver operation is useful with a reply code specific or unique to that transponder and which it broadcasts at a variable and externally-controllable or - commanded rate. The identification of vehicles or, more generally, objects so-equipped, for example, is of utility in some apparatus, altogether apart from tracking the same.

Though the invention has been described, moreover, in its preferred mode of operation as a national system, clearly, as before stated, the vehicle identification code material and the like may be stored and supplied within the state or other locale without cooperation with NCIC.

Other well-known circuits and apparatus and conventionally derived software for performing the state functions than those shown may also be used, as may certain functions be omitted if not desired; and while specified features of the invention may be shown in some drawings and not others, this is for convenience and clarity of description only, it being understood that each feature may be combined with any or all of the other features of the invention. Similarly the particular selection of frequency reply rates, type of encoding, audio tone range, etc., types of tracking, communication and broadcasting antennas, etc., are illustrative of what is believed to be preferred and what has been successfully experimentally tested; but further modifications will occur to those skilled in this art, and such are considered to fall within the spirit and scope of the invention as defined in the appended claims.

What is claimed is:

1. Transponder vehicle tracking apparatus having, in combination, direction-finding means for receiving activated vehicle transponder periodic radio reply signals carrying vehicle identification code information and for alphanumerically displaying the same; means also responsive to the last-named means for simultaneously displaying both the bearing from which the transponder reply signals are received and the signal strength thereof; means for locking onto and displaying only radio reply signals of a selected vehicle transponder; means for requesting the transmission of a transponder command signal that commands an increased rate of transmission of the periodic transponder reply signals; and means for displaying said code information and said signal strength at such increased rate to aid in homing-in on the vehicle.

2. Apparatus as claimed in claim 1 and in which said vehicle identification code information is in a modulation signal imposed on a carrier frequency and in which said displaying means provides a display corresponding to said modulation signal.

3. Apparatus as claimed in claim 2 and in which there is provided means for demodulating said modulation signal before said identification code information is displayed.

* * * * *